United States Patent [19]

Sullivan, Jr.

[11] Patent Number: 4,641,368

[45] Date of Patent: Feb. 3, 1987

[54] RADIO FREQUENCY RECEIVER

[75] Inventor: William B. Sullivan, Jr., Verona, N.J.

[73] Assignee: Raytheon Company, Lexington, Mass.

[21] Appl. No.: 716,784

[22] Filed: Mar. 20, 1985

Related U.S. Application Data

[62] Division of Ser. No. 423,411, Sep. 24, 1982, Pat. No. 4,535,286, which is a division of Ser. No. 90,811, Nov. 2, 1979, Pat. No. 4,363,139.

[51] Int. Cl.$^4$ .............................................. H04B 1/16
[52] U.S. Cl. .................................. 455/239; 328/175; 330/280; 330/281; 330/284; 375/98; 455/249; 455/250
[58] Field of Search ............... 455/242, 243, 249, 239, 455/250, 234, 72, 254, 240; 375/98; 381/108, 106; 358/174, 177, 179; 343/7 AG; 330/280, 281, 284, 279, 132; 328/169, 171, 175; 307/264, 562

[56] References Cited

U.S. PATENT DOCUMENTS

| | | | |
|---|---|---|---|
| 2,838,659 | 6/1958 | Mantz et al. | 455/242 |
| 3,619,786 | 11/1971 | Wilcox | 455/249 |
| 3,904,971 | 9/1975 | Delagrange | 330/280 |
| 4,119,918 | 10/1978 | Moser | 328/175 |
| 4,292,598 | 9/1981 | Yasumura | 330/281 |

Primary Examiner—Marc E. Bookbinder
Attorney, Agent, or Firm—Richard M. Sharkansky; Philip J. McFarland; Scott W. McLellan

[57] ABSTRACT

A radio frequency receiver wherein received signals are directed to a mixer through a pair of signal channels, the bandwidth of one of the pair of signal channels being a selected narrow portion of the bandwidth of the other one of the pair of signal channels. With such arrangement a received signal within a wide band of frequencies is passed to the mixer through both channels to become homodyned to a fixed intermediate frequency signal. Noise received by the wide bandwidth receiver while also passed through the both channels is mixed with only a narrow portion of itself, and hence the amount of noise at the fixed intermediate frequency is reduced with the result that the sensitivity of the receiver is correspondingly increased. An instantaneous frequency measuring unit is also fed by the selected narrow portion of the wide bandwidth signal channel to determine the frequency of the received signal with improved sensitivity.

2 Claims, 4 Drawing Figures

RADIO FREQUENCY RECEIVER

CROSS-REFERENCE TO RELATED APPLICATIONS

This is a division of application Ser. No. 423,411, filed Sept. 24, 1982, now U.S. Pat. No. 4,535,286, which is a division of application Ser. No. 090,811, filed Nov. 2, 1979, now U.S. Pat. No. 4,363,139.

BACKGROUND OF THE INVENTION

This invention relates generally to radio frequency receivers and more particularly to wide bandwidth radio frequency receivers.

As is known in the art, wide bandwidth radio frequency receivers have many applications, as, for example, in radio frequency signal direction finding apparatus. One such receiver suggested for such application is a homodyne receiver wherein a first portion of a received signal is fed to a mixer together with a second portion of the received signal. Generally, one of the portions of the received signal is translated in frequency to a fixed intermediate frequency (IF) with the result that any signal received by the receiver over an extremely wide band of frequencies appears at the output of the mixer at the fixed IF frequency. This output signal is then processed by subsequent signal processing apparatus designed to operate in response to signals at the fixed IF signal. Consequently, such processing apparatus is adapted to process received signals having a frequency within an extremely wide bandwidth. In a practical environment, however, the received signal is in the presence of background noise. Since the noise typically has a wide bandwidth, the frequency spectrum of the noise is spread over the entire receiver bandwidth. It follows, then, that the larger the receiver bandwidth, the larger the amount of noise received by the receiver, thereby reducing the sensitivity of the receiver. In particular, in the homodyne receiver described above, since noise is fed to the mixer along with the first and second portions of received signal, the amount of noise produced at the output of the mixer at the intermediate frequency is proportional to the square root of the bandwidth of the receiver. Consequently, receiver bandwidth must be compromised by noise, and hence receiver sensitivity, considerations.

A second type of wide bandwidth receiver system is a so-called multi-channel receiver. Here a plurality of narrow bandwidth receivers each heterodynes the received signal to a corresponding plurality of intermediate frequencies which pass through the receivers. While such multi-channel receiver systems have a sensitivity related to the bandwidth of any one of the relatively narrow bandwidth receivers, such systems are relatively expensive since they require a large number of individual receivers.

SUMMARY OF THE INVENTION

In accordance with the present invention, a radio frequency receiver is provided having means for directing signals within a predetermined band of frequencies to a pair of signal channels, the bandwidth of one of such pair of signal channels being a selected narrow portion of the bandwidth of the other one of such pair of signal channels; and, means for mixing signals passed through the pair of signal channels.

In a preferred embodiment of the invention, a relatively wide bandwidth receiver has a correspondingly wide bandwidth signal channel coupled to the mixing means along with a selected, narrow portion of this wide bandwidth signal channel. The narrow portion of the wide bandwidth signal channel is selected to include the frequency of a received signal. With such arrangement, the received signal is passed to the mixing means through both signal channels and is therefore homodyned to a corresponding signal having a fixed frequency regardless of the frequency of the received signal. Noise received by the wide bandwidth receiver is, however, mixed with only a narrow portion of itself, and hence the amount of noise at the fixed frequency is reduced with the result that the sensitivity of the wide bandwidth receiver is correspondingly improved.

Further, the narrow band portion of the wide bandwidth signal channel is, in addition to being coupled to the mixer, coupled to an instantaneous frequency measuring unit (IFM) to determine the frequency of the received signal. With this arrangement, since only a small portion of the receiver bandwidth is fed to the IFM the sensitivity of the IFM is improved because the amount of noise passing to the IFM is limited.

BRIEF DESCRIPTION OF THE DRAWINGS

The foregoing features of this invention, as well as the invention itself, may be more fully understood from the detailed description read together with the accompanying drawings, in which.

DESCRIPTION OF THE PREFERRED EMBODIMENTS

Figure 1:
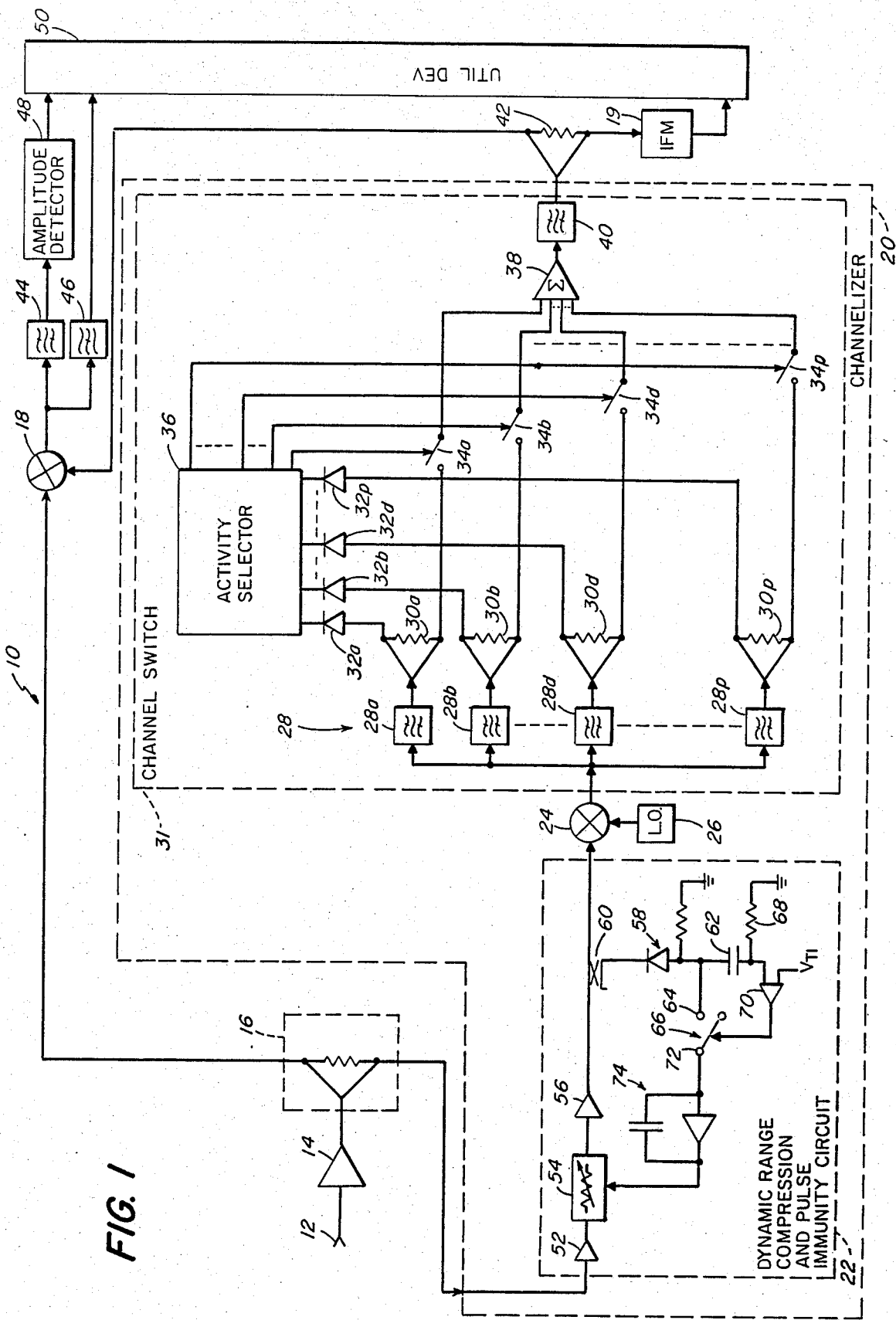
FIG. 1 is a block diagram of a radio frequency receiver according to the invention.

Referring now to FIG. 1, a radio frequency receiver 10, here adapted to receive both continuous wave (CW) and pulsed signals, is shown to include a conventional radio frequency antenna 12, a radio frequency amplifier 14 of any conventional design, here having a 4 GHz bandwidth, from 2 GHz to 6 GHz, and a two-to-one power divider 16, also of conventional design, for directing equal portions of the received radio frequency signals into a pair of signal channels. The portion of the received signals directed to the upper signal channel is fed to one input of a conventional mixer, here a double balanced mixer 18, as shown. The portion of the received signals directed to the lower signal channel is passed to a second input of the double balanced mixer 18 and to a conventional instantaneous frequency measurement (IFM) unit 19 through a channelizer 20, the details of which will be described hereinafter. Suffice it to say here, however, that the channelizer 20 passes only signals within a selected narrow portion of the 4 GHz receiver bandwidth to the second input of mixer 18. In particular, while the upper signal channel passes all signals within the 4 GHz receiver bandwidth to mixer 18, channelizer 20 passes only a narrow band of frequencies, which includes a received signal, through the lower signal channel to mixer 18, and hence the bandwidth of the lower signal channel is only a selected narrow portion of the upper signal channel bandwidth. Because the received signal passes to mixer 18 through both the upper and lower signal channels, such signal is homodyned to a fixed intermediate frequency. Also, since the lower signal channel bandwidth is only a narrow portion of the receiver bandwidth, while received noise having the entire receiver bandwidth passes to mixer 18 through the upper signal channel, only a narrow band portion of received noise is fed through the lower signal channel to mixer 18 and, therefore, the noise level at the fixed, predetermined frequency is relatively low.

Referring now in more detail to the channelizer 20, it is noted that such channelizer 20 includes a dynamic range compression and pulse immunity circuit 22 fed by one of the pair of outputs of the power divider 16, as shown. Such dynamic range and pulse immunity circuit 22 provides automatic gain control to limit the dynamic range of CW signals at a constant, predetermined level while allowing received pulses to rise above such constant level to enable subsequent processing circuitry, to be described, to respond to such received pulses either in the presence, or absence, of received CW signals.

The dynamic range limited CW signals and/or received pulses produced at the output of the dynamic range compression and pulse immunity circuit 22 are radio frequency signals having frequencies within the bandwidth of the radio frequency amplifier 14. These signals are fed to a conventional mixer, here a single sideband mixer 24, together with a local oscillator signal, here a 750 MHz signal, produced by a conventional local oscillator 26. The effect of the mixer 24 is to heterodyne, and thereby translate, the frequencies of the received signals (passed to the mixer 24 from the dynamic range compression and pulse immunity circuit 22) by a fixed frequency, here the 750 MHz frequency of the local oscillator signal; here such signals are translated from a frequencies within the 2-6 GHz bandwidth to corresponding signals within a 2.75-6.75 GHz bandwidth.

The signals produced at the output of mixer 24 are fed to a channel switch 31. Such channel switch 31 includes a bank of filters 28, here such bank of filters 28 includes sixteen bandpass filters 28a-28p having contiguous frequency cells over a bandwidth here 4.096 GHz wide. Here each one of the filters 28a-28p has a 256 MHz bandwidth. Each one of the filters 28a-28p has a different center frequency, here filters 28a-28p having center frequencies 2.83 GHz to 6.67 GHz, respectively.

The outputs of the bandpass filters 28a-28p are fed to corresponding plurality of 2:1 power dividers 30a-30p, respectively, as shown. In particular, one of the pair of outputs of each one of the power dividers 30a-30p is fed to a corresponding one of a plurality of diode detectors 32a-32p, and the other one of the pair of outputs is fed to a corresponding one of a plurality of switches 34a-34p, as shown. The outputs of detectors 32a-32p are fed to an activity selector 36, the details of which will be described hereinafter. Suffice it to say here, however, that in response to the signals fed to the activity selector 36, such selector 36 activates a selected one of the plurality of switches 34a-34p to electrically couple a selected one of the bandpass filters 28a-28p to the second input of mixer 18, to enable the signals passed by such selectively coupled one of the filters 28a-28p to serve as the local oscillator signal for such mixer 18. In particular, the selectively coupled one of the filters 28a-28p is coupled to mixer 18, and to IFM 19, through a summing amplifier 38, a bandpass filter 40 (here having a bandpass from 2.75 GHz to 6.75 GHz) and a 2:1 power divider 42, as shown. As will be described in detail hereinafter, activity selector 36 activates a selected one of the switches 34a-34p in accordance with the following basic criteria:

(1) If a CW signal having a single frequency $f_1$ within a 2-6 GHz band of frequencies is being received, activity selector 36 activates the one of the switches 34a-34p coupled to the one of the filters 30a-30p which has a pass band which includes the frequency $f_1 + 750$ MHz;

(2) If a plurality of CW signals having different frequencies $f_1-f_n$, each frequency being within a 2-6 GHz band of frequencies, is being received and one of the signals is significantly stronger than the others, as for example the signal having the frequency $f_1$ is significantly stronger than the signals having the frequencies $f_2-f_n$, activity selector 36 activates the one of the switches 34a-34p coupled to the one of the filters 30a-30p which has a pass band which includes the frequency of the stronger signal increased by 750 MHz, as, in the example, the one of the filters 30a-30p which has a pass band which includes the frequency $f_1 + 750$ MHz;

(3) If a plurality of CW signals having different frequencies $f_1-f_n$, each frequency being within a 2-6 GHz band of frequencies is being received and more than one of the plurality of frequencies have substantially equal signal strengths, activity selector 36 activates the one of the switches 34a-34p coupled to the one of the filters 30a-30p which has a pass band which includes here the lower one of the frequencies $f_1$ to $f_n$ increased by 750 MHz (for example, if $f_1 < f_2$ to $f_n$, the one of the filters 30a-30p which has a pass band which includes the frequency $f_1 + 750$ MHz);

(4) If a pulse having a frequency $f_1$ within a 2-6 GHz band of frequencies is being received, activity selector 36 activates the one of the switches 34a-34p coupled to the one of the filters 30a-30p which has a pass band which includes $f_1 + 750$ MHz;

(5) If a plurality of pulses having different frequencies $f_1-f_n$ each within a 2-6 GHz band of frequencies is being received and one of the pulses is significantly stronger than the others, as, for example, the pulse having the frequency $f_1$ is significantly stronger than the pulses having the frequencies $f_2-f_n$, activity selector 36 activates the one of the switches 34a-34p coupled to the one of the filters 30a-30p which has a pass band which includes the frequency of the stronger signal, increased by 750 MHz, as, in the example, the one of the filters 30a-30p which has a pass band which includes the frequency $f_1 + 750$ MHz;

(6) If a plurality of pulses having different frequencies $f_1-f_n$, each frequency being within a 2-6 GHz band of frequencies, is being received and more than one of the plurality of pulses have substantially equal strengths, activity selector 36 activates the one of the switches 34a-34p coupled to the one of the filters 30a-30p which has a pass band which here includes the lower one of the frequencies $f_1$ to $f_n$ increased by 750 MHz (for example, if $f_1 < f_2$ to $f_n$, the one of the filters 30a-30p which has a pass band which includes the frequency $f_1 + 750$ MHz).

Other conditions will become apparent hereinafter in connection with the detailed description of the activity selector 36. Suffice it to say here, however, that in any event, a received signal having a frequency of interest is coupled to mixer 18 through both the upper and lower signal channels to become homodyned to a fixed, predetermined intermediate frequency, i.e., the frequency of the local oscillator 26, here 750 MHz. However, while the entire 4 GHz frequency spectrum of received noise passes through the upper signal channel to mixer 18, only a narrow portion of such spectrum, here 256 MHz, passes through the lower signal channel to such mixer 18 and to the IFM 19.

The signals produced at the output of mixer 18 are fed to a bandpass filter 44 tuned to the intermediate frequency signal, here 750 MHz, and a notch filter 46 having a narrow rejection band centered at the intermediate frequency signal (i.e., a bandwidth 250-725 MHz and 775-1250 MHz). The bandwidth of the bandpass filter 44 is here 50 MHz. Because the signals produced at the output of the mixer 18 are the result of mixing the wide band signals fed through the upper signal channel with relatively narrow band signals which passes through the lower signal channel, and the signals fed to the mixer 28 are then homodyned to the intermediate frequency and narrow-band filtered by narrow band filter 44, the sensitivity of the receiver 10 is relatively high since here the sensitivity may be considered as a function of only the bandwidth of one of the narrow band filters 38a-38p, $B_C$, here 256 MHz, and the noise bandwidth of filter 44, $B_I$, here 50 MHz, as $\alpha = \sqrt{B_C B_I}$, whereas in a homodyne receiver which mixes the entire bandwidths of the channels the sensitivity is a function of the entire receiver bandwidth $B_R$ (here 4 GHz) and the noise bandwidth of the filter 44, as $\alpha = \sqrt{B_R B_I}$.

The signals produced at the output of filter 44 are used to provide amplitude information of the received signals. It is noted that, because all received signals will be at the fixed IF frequency, 750 MHz, the output of filter 44 does not provide frequency information of the received signal. However, while the lower signal channel does have an automatic gain control loop, at least for CW signals, the upper signal channel does not have such a gain control loop and, consequently, the amplitude of the signal produced at the output of the mixer 18 is related to the amplitude of the received signal. This amplitude is converted to a digital word by an amplitude detector 48, which here includes an envelope detector (not shown) and an analog-to-digital (A/D) converter (not shown), the output of which is fed to a utilization device 50, here a conventional display.

On the other hand, it is noted that the signal fed to IFM 19, while being amplitude limited by the AGC loop in circuit 22, has a frequency related to the frequency of the received signal. (In particular, the frequency of the signal fed to IFM 19 is the frequency of the received signal, $f_R$, plus 750 MHz, i.e., $f_R + 750$ MHz.) The IFM 19 is here of any conventional design and produces a digital word which is fed to the utilization device 50, such digital word being representative of the frequency of the received signal, $f_R$.

In operation, consider for example a CW signal is being received, such signal having a frequency of 3 GHz. A portion of such signal is fed to the mixer 18 through the upper signal channel and another portion of such signal is AGC'd by the dynamic range and pulse immunity circuit 22, then translated in frequency by local oscillator 26 and mixer 24 to a frequency of 3.750 GHz, and then passed by only one of the band pass filters 28a-28p, here filter 28d. Activity selector 36d will, in response to the signal fed to detector 32d, activate switch 34d to selectively couple only filter 28d to summing amplifier 38 so that a signal having a frequency of 3.750 GHz will be fed to mixer 18 and IFM 19 through summing amplifier 38, bandpass filter 40 and power divider 42. The IFM 19 will produce a digital signal representative of the 3.750 GHz frequency of the received signal, and the 3.750 GHz signal fed to mixer 18 will serve as a local oscillator signal to produce a signal out of mixer 18 having a frequency of 750 MHz. This signal will pass to amplitude detector 48 where a digital signal representative of the amplitude of the signal fed to mixer 18 via the upper signal channel will be produced. It is noted that the 750 MHz signal fed to notch filter 46 will be rejected by such filter 46. Now consider that, for example, both a stronger signal at 3 GHz and a substantially weaker signal at 3.5 GHz are being received. While portions of both signals pass to the mixer 18 through the upper signal channel, activity selector 36 will again activate only one of the switches 34a-34p, here, as described above, the one of the filters 28a-28p which passes the stronger 3 GHz signal, here filter 34d. Therefore, only the stronger signal, now translated in the lower signal channel to 3.750 GHz, will pass through the lower signal channel to mixer 18 while both the 3 GHz and 3.5 GHz signal pass to such mixer 18 through the upper signal channel. The 3 GHz and 3.750 GHz signals fed to mixer 18 through both the upper and lower signal channels will produce an IF at 750 MHz, such IF signal passing through filter 44 to amplitude detector 48. Also, only the stronger signal, now at 3.750 GHz, in the lower signal channel passes to IFM 19. The weaker 3.5 GHz signal fed to mixer 18 via the upper signal channel will mix with the 3.750 GHz signal fed to the mixer 18 through the lower signal channel to produce an IF signal at 250 MHz. This 250 MHz IF signal will be rejected by filter 44 but will pass through notch filter 46 to utilization device 50 to indicate the presence of another signal being simultaneously received.

Considering now the details of dynamic range compression and pulse immunity circuit 22, such circuit 22 includes an input amplifier 52 coupled to the lower signal channel output of the 2:1 power divider 16, as shown. The output of input amplifier 52 is coupled to a voltage controlled attenuator 54, here a p-i-n device. The output of the voltage controlled attenuator 54 is coupled to a limiting amplifier 56. The output of limiting amplifier 56 is fed to mixer 24, and a portion of the output of amplifier 56 is fed to a diode detector circuit 58 through a conventional hybrid coupler 60, as shown. The output of the diode detector circuit 58 is coupled to a capacitor 62 and to a first terminal 64 of an electronic switch 66, as shown. The output of the capacitor 62 is fed to a ground through a resistor 68 and to an input of a comparator 70, as shown. A second input of the comparator 70 is fed to a threshold voltage source, $V_{T1}$, as shown. The output of the comparator 70 provides the control signal for electronic switch 66, as indicated. The output 72 of electronic switch 66 is coupled to an integrator 74. The output of integrator 74 provides the control voltage for the voltage controlled attenuator 54, as indicated.

The dynamic range compression and pulse immunity circuit 22 is a combination of a CW automatic gain control (AGC) loop and limiting amplifier with the addition of a pulse immunity circuit. Received radio frequency signals directed to the lower signal channel pass through input amplifier 52 to attenuator 54 where they are attenuated in accordance with the control voltage produced by integrator 74. The bandwidth of the amplifier 52 and attenuator 54 are sufficient to pass signals with the 2-6 GHz bandwidth. The attenuated signals are then amplified by limiting amplifier 56, such amplifier 56 also having a bandwidth sufficient to pass signals within the 2-6 GHz bandwidth. A portion of the output of the limiting amplifier 56 is fed to the diode detector circuit 58 via coupler 60. In response to received CW signals or noise, a DC signal is produced at the output of the diode detector circuit 58. While this DC signal is electrically coupled to input terminal 64 of electronic switch 66, such DC signal is, however, blocked by capacitor 62 from passing to comparator 70. Hence, since the threshold voltage $V_{T1}$ is greater than the signal fed to comparator 70 via capacitor 62, the output of comparator 70 electrically couples input terminal 64 to output terminal 72, thereby electrically coupling the DC signal produced at the output of diode detector 50 to the input of integrator 74. The dynamic range compression and pulse immunity circuit 22 now acts, in response to the DC signal fed to integrator 74, as an AGC loop with the output voltage produced by integrator 74 controlling the amount of attenuation provided by attenuator 54. Here the circuit 22 is designed so that the voltage controlled attenuator 54 maintains the CW signal power or noise power produced at the output of limiting amplifier 56 at a constant, predetermined level, here 6 db below the limiting level of the limiting amplifier 56. (Further, the limiting level of limiting amplifier 56 is selected so that in response to a received CW signal a sufficient voltage to be produced of the output of one of the detectors 32a-32p to properly activate activity selector 36, as will be described.) In the presence of a received pulse, however, the limiting amplifier 56 will saturate, restricting the maximum pulse amplitude out of the limiting amplifier 56 to here approximately 6 db above the average CW or noise level. In response to the leading edge of the received pulse, a step change in the voltage is produced at the output of diode detector 58. The step change in voltage is AC coupled through capacitor 62 to comparator 70 and also to input terminal 64 of electronic switch 66. The voltage change coupled to comparator 70 rises above the threshold voltage $V_{T1}$ for a time duration sufficiently long to enable comparator 70 to electrically decouple input 64 from output 72. Therefore, in response to the received pulse, the control signal produced by comparator 70, causes the AGC loop to open circuit and effectively cause the integrator 74 to hold its output at its last previous level. This continues until the voltage fed to the input of comparator 70 from capacitor 62 falls below the threshold voltage $V_{T1}$. Consequently, the dynamic range compression and pulse immunity circuit 22 is desensitized or made immune, as to the AGC action, to received high duty cycle pulse signals. The net result is the operation of an AGC circuit which holds noise or CW signals constant but allows pulses to rise above, here 6 db above, the quiescent level of the CW or noise signals, without substantially affecting the average AGC operating point. This permits subsequent processing circuits, in particular the activity selector 36, to easily trigger in response to pulses received in the presence or absence of received CW signals. It is noted that, for reasons to become apparent, while a received signal will pass through only a single one of the filters 30a-30p and become detected by a single one of the detectors 32a-32p to produce a sufficiently high voltage to activate activity selector 36, noise passing out of mixer 24 will become equally divided in power between filters 28a-28p and hence will not enable any one of the detectors 32a-32p to produce a sufficiently high voltage to activate activity selector 36.

Figure 2:
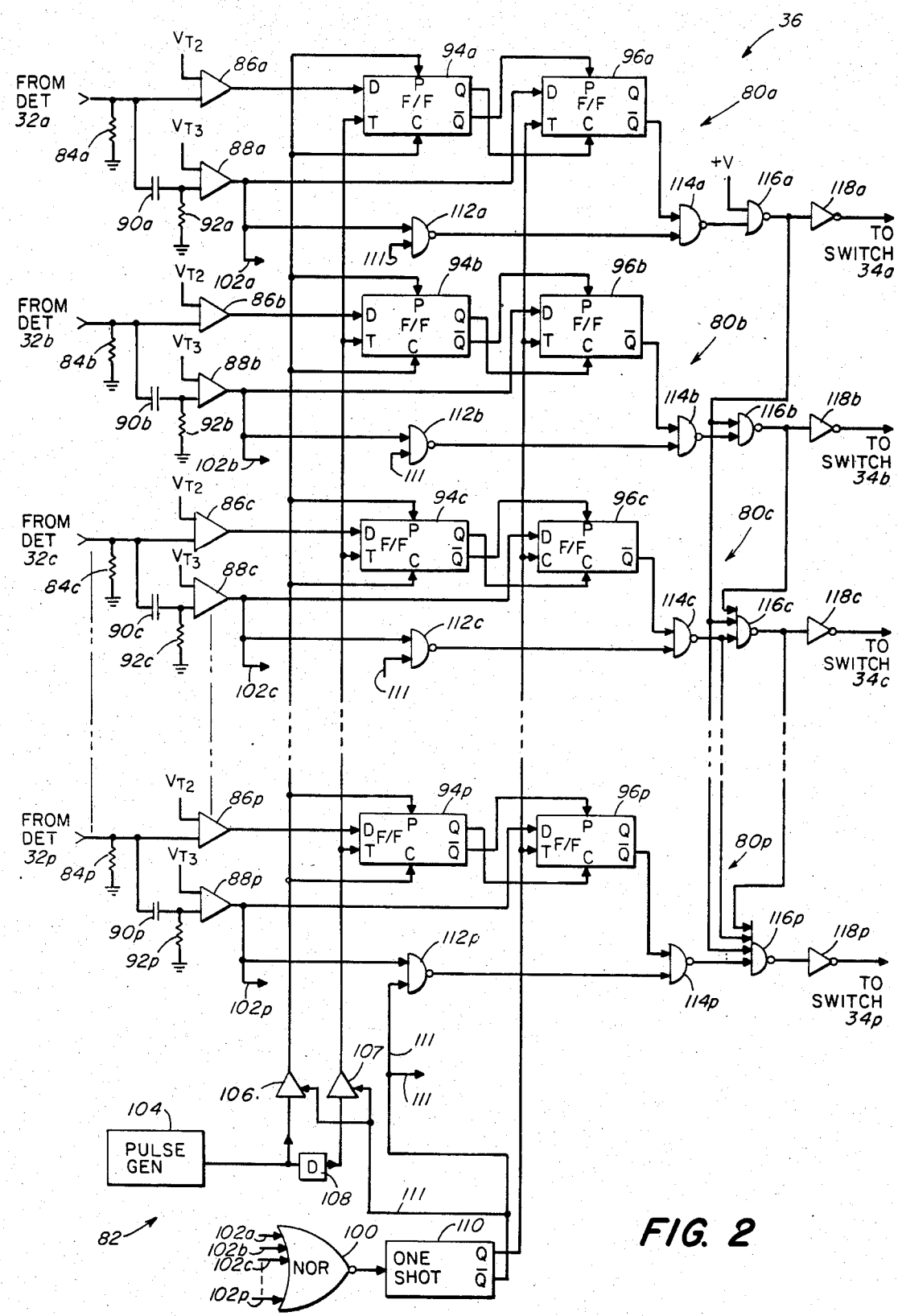
FIG. 2 is a schematic diagram of an activity selector used in the receiver of FIG. 1.

Considering now the details of activity selector 36, reference is made also to FIG. 2 wherein such activity selector 36 is shown to include a plurality of, here sixteen, logic sections 80a-80p, and a control section 82 coupled to each one of the plurality of logic sections 80a-80p. Logic sections 80a-80p are fed by signals produced by detectors 32a-32p (FIG. 1), respectively, and produce control signals for switches 34a-34p (FIG. 1) coupled to the outputs of logic sections 80a-80p, respectively, as indicated.

The logic sections 80a-80p include input resistors 84a-84p coupled to the output of a corresponding one of the detectors 32a-32p, respectively, and ground, as indicated, for producing a voltage in accordance with the level of the RF signals fed to such detectors 32a-32p. The voltages produced at the outputs of resistors 84a-84p are DC coupled to comparators 86a-86p, respectively, and are AC coupled to comparators 88a-88p through capacitors 90a-90p and resistors 92a-92p, as shown. A second input to comparators 86a-86p is a voltage reference source $V_{T2}$ and a second input to comparators 88a-88p is a voltage reference source $V_{T3}$, as shown. The voltage reference source $V_{T2}$ is selected so that, if a CW signal is received, the dynamic range compression and pulse immunity circuit 22 will cause a voltage to be produced at the input to one of the comparators 86a-86p which is greater than such reference voltage source $V_{T2}$ to enable the output of such one of the comparators 86a-86p to go "high" (i.e., produce a logical 1 signal) whereas, in the absence of any CW received signal the voltage produced at the input to such comparator will be less than $V_{T2}$ and such comparator will produce a low (or logical 0) output signal. It is noted that while a received signal will pass to a single one of the detectors 32a-32p to cause activation of one of the comparators 86a-86p, noise power is distributed equally to all detectors 32a-32p and will not be sufficiently strong to significantly activate any one of the detectors 32a-32. Further, if a plurality of CW signals of different frequencies are being received each of substantially equal signal power level, i.e., within 8 db of each other, the threshold voltages $V_{T2}$ of the plurality of comparators 86a-86p fed by such signals will be exceeded so that the outputs of such plurality of comparators 86a-86p will also be high or logical 1. As will be described hereinafter, however, activity selector 36 will allow only a selected one of such signals to pass through to summing amplifier 28, here the signal with the lowest frequency. In this regard, it is noted that the relative signal strengths of the plurality of received signals is maintained by the AGC action of the dynamic range and pulse immunity circuit 22. Thus, for example, if a pair of signals of different frequencies are being received simultaneously and one is 8 db stronger than the other, this 8 db relative strength differential will be maintained by the dynamic range and pulse immunity circuit 22 so that, for example, if the stronger signal is fed through filter 30a (FIG. 1) and detector 32a to comparator 86a while the other weaker signal is fed through, for example, filter 30b (FIG. 1) and detector 32b to comparator 86b, while the input voltage to comparator 86a will exceed the voltage $V_{T2}$ with the result that, while comparator 86a produces a logical 1 signal, the input voltage to comparator 86b will not exceed the voltage $V_{T2}$ and comparator 86b, as well as comparators 86c-86p, will produce a logical 0 signal.

It is noted that comparators 88a-88p are a-c coupled to detectors 32a-32p and, therefore, during reception of CW signals the detected signals are blocked from passing to the inputs of such comparators 88a-88p because of capacitors 90a-90p. Consequently, the threshold voltages of such comparators 88a-88p are not exceeded and such comparators 88a-88p produce logical 0 signals. In response to a received pulse, however, a pulse is produced at the output of one of the detectors 32a-32p and such pulse is a-c coupled to one of the comparators 88a-88p (in addition to being coupled to dc coupled comparators 86a-86p). It is noted that, if a single pulse is detected, the level of the pulse coupled to one of the comparators 88a-88p is sufficient for such comparator to produce a logical 1 signal whereas in the absence of such coupled pulse such comparator will produce a logical 0 signal. Further, if a pulse is received in the presence of a CW signal, as noted above, such pulse will increase the output of dynamic range compression and pulse immunity circuit 22 and, if of sufficient relative strength, will produce a step voltage change in the output of one of the detectors 32a-32p, such change in voltage being a-c coupled to the corresponding comparator, causing such corresponding one of the comparators 88a-88p to produce a logical 1 signal.

The outputs of comparators 86a-86p are coupled to the "D" terminals of flip/flops 94a-94p, and the outputs of comparators 88a-88p are fed to the "D" terminals of flip/flops 96a-96p, as shown, here such flip/flops 94a-94p and 96a-96p being Model SN 54S74, manufactured by Texas Instruments, Inc., Dallas, Tex. The outputs of comparators 88a-88p are coupled to corresponding ones of a plurality of NAND gates 112a-112p, as shown, and such outputs are coupled to a NOR gate 100 via lines 102a-102p respectively, as shown. The Q outputs of flip/flops 94a-94p are coupled to the clear (C) inputs of flip/flops 96a-96p, respectively, as shown, and the $\overline{Q}$ outputs of flip/flops 94a-94p are coupled to the preset (P) terminals of flip/flops 96a-96p, respectively, as shown.

A pulse generator 104, of any conventional design, is provided to produce a train of pulses having a 200 ns. time duration (i.e., logical 1 signal) at a 100 Hz rate. These pulses are periodically applied to test for the presence of received CW signals. The output of pulse generator 104 is fed to a gated amplifier 106, as shown. The output of gated amplifier 106 is coupled to both the preset (P) and clear (C) terminals of flip/flops 94a-94p and also to the T inputs of such flip/flops 94a-94p through a 6 ns. delay provided by a conventional time delay circuit 108 and a gated amplifier 107.

The output of NOR gate 100 is fed to a conventional one-shot multivibrator 110, here adapted to produce a change state in response to a negative going pulse fed thereto from NOR gate 100. In particular, the Q output of one-shot multivibrator 110 is normally low and, therefore, the $\overline{Q}$ output is normally high. When the output of NOR gate 100 goes from a logical 1 to a logical 0 state, a pulse is produced by the one-shot multivibrator 110, in particular the signal at output Q of such one-shot multivibrator goes high or logical 1 for a time duration of, here, 250 microseconds, whereas the signal at the output of $\overline{Q}$ goes low for 250 microseconds. This time duration is selected to be as long as the longest pulse expected to be received by the receiver. The Q output of one-shot multivibrator 110 is fed to the T inputs of flip/flops 96a-96p, and the $\overline{Q}$ output of one-shot multivibrator 110 is fed to NAND gates 112a-112p through line 111, as indicated. Also fed to NAND gates 112a-112p are the outputs of comparators 88a-88p, respectively, as shown. The $\overline{Q}$ outputs of flip/flops 96a-96p are fed to NAND gates 114a-114p, respectively, as shown. The outputs of NAND gates 112a-112p are also fed to NAND gates 114a-114p, respectively, as shown. The outputs of NAND gates 114a-114p are fed to NAND gates 116a-116p, respectively, as shown. It is noted that a second input to NAND gate 116a is a voltage source +V, here sufficient to represent a logical 1 signal for such NAND gate. It is further noted that a second input to NAND gate 116b is the output of NAND gate 116a. More generally, the output of NAND gate 116a is fed as an input to NAND gates 116b-116p. Likewise, the output of NAND gate 116b is fed as an input to NAND gates 116c-116p. Still likewise, the output of NAND gate 116c is fed as an input to lower NAND gates 116d-116p, so that, for example, NAND gate 116p has as inputs, in addition to the output of NAND gate 114p, the outputs of NAND gates 116a-116o (not shown). Completing the activity selector 36, the outputs of NAND gates 116a-116p are fed through inverters 118a-118p, respectively, to switches 34a-34p (FIG. 1), respectively, as indicated.

In operation, first consider the reception of a single frequency CW signal, here having a frequency which enables such signal to pass through bandpass filter 28a (FIG. 1). When the activity selector 36 responds to a received pulse signal a low signal is produced at output $\overline{Q}$ of one shot multivibrator 110 and is fed to gated amplifiers 106, 107 to inhibit pulses from pulse generator 104 from passing to the P and C terminals of flip/flops 94a-94p. As discussed above, when a test is made to determine the presence of a received CW signal, a 200 ns pulse passes through such gated amplifier 106, through delay circuit 108 and amplifier 107 to the P and C inputs of flip/flops 94a-94p (unless the activity selector 36 is processing a pulse, as noted above). Further, the threshold voltage $V_{T2}$ fed to comparator 86a is exceeded while the threshold voltages fed to comparators 86b-86p are not exceeded so that comparator 86a produces a logical 1 and comparators 86b-86p produce logical 0 signals. It is also noted that capacitors 90a-90b inhibit comparators 88a-88b from producing logical 1 signals so that such comparators 88a-88p produce logical 0 signals. Each time a pulse is fed to the P and C inputs of flip/flops 94a-94p by gated amplifier 106 a short time thereafter a pulse is fed to terminals T thereof by delay circuit 108 and amplifier 107 so that flip/flop 94a stores a logical 1 fed to it from comparator 96a and flip/flops 94b-94p store a logical 0 fed to them from comparators 96b-96p. In response to the logical 1 signal stored in flip/flop 94a, a logical 1 is produced at output Q of flip/flop 94a and a logical 0 is produced at output $\overline{Q}$. Likewise, the logical 0 stored in flip/flops 94b-94p produces a logical 0 at the Q outputs of such flip/flops and logical 1 at the $\overline{Q}$ outputs of such flip/flops. These signals produce a logical 1 signal at the C input of flip/flop 96a and a logical 0 at the P input of such flip/flop, while a logical 1 is produced at the P inputs of flip/flops 96b-96p and a logical 0 is produced at the C inputs of flip/flops 96b-96p. In response to such signals, the output $\overline{Q}$ of flip/flop 96a is forced to produce a logical 0 signal, and the $\overline{Q}$ outputs of flip/flops 96b-96p are forced to produce logical 1 signals. (It is also noted that during this time because the outputs of comparators 88a-88p are all low (logical 0), one-shot multivibrator 110 is not triggered and, hence, output $\overline{Q}$ thereof is at its normally logical 1 state.) Consequently, the outputs of NAND gates 112a–112p are all logical 1. However, since the output $\overline{Q}$ of flip/flop 96a is logical 0 while the outputs of $\overline{Q}$ of flip/flops 96b–96p are all logical 1, the output of NAND gate 114a will be logical 1 while the outputs of NAND gates 114b–114p will be logical 0. Consequently, a logical 0 will be produced at the output of NAND gate 116a while logical 1 will be produced at the outputs of NAND gates 116b–116p. It follows, then, that the output of inverter 118a will be high and the outputs of inverters 118b–118p will be low. The high signal at the output of inverter 118a activates switch 34a, switches 34b–34p remaining deactivated by the low signals produced at the outputs of inverters 118b–118p.

Consider now, for example, a pair of CW signals being received, one of such signals being significantly stronger than the other (i.e., greater than 8 db. stronger). The dynamic range compression and pulse immunity circuit 22 (FIG. 1) will AGC both signals and will adjust the level of such signal so that the AGC'd level of the stronger signal will be (6 db) below the limiting level of limiting amplifier 56 (FIG. 1). The weaker signal, however, will remain here 8 db below the AGC'd level of the stronger signal. Therefore, if, for example, example, the stronger signal has a frequency which is within the pass band of filter 28a and the weaker signal has a frequency which is within the pass band of, say, filter 28b, for example, while the threshold level of comparator 86a will be exceeded so that such comparator 86b produces a logical 1 signal, the threshold level of comparator 86b will not be exceeded so that such comparator 86b, as well as all other comparators 86c–86p, will produce logical 0 signals. Therefore, activity selector 36 will respond as described above as if only one CW signal is being received and, for the example given above, switch 34a will become activated to electrically couple filter 28a (FIG. 1) to the summing amplifier 38 (FIG. 1).

Considering as a further example a pair of CW signals being received simultaneously where each signal has substantially the same strength, here a pair of the plurality of comparators 88a–88p will produce logical 1 signals. Thus, for example, if comparators 88b and 88c produce logical 1 signals, comparators 88a, 88d–88p producing logical 0 signals, it is apparent from the discussion above that NAND gates 114a and 114d–114p will produce logical 0 signals. Here, however, NAND gates 114b and 114c will produce a logical 1 signal. Further, NAND gate 116a will produce a logical 1 signal and such signal is fed to NAND gates 116b–116p. Therefore, since both inputs to NAND gate 116b are logical 1, such NAND gate 116b will produce a logical 0. The logical 0 signal causes activation of switch 34b and also is fed as an input to NAND gate 116c. Therefore, while two of the inputs to NAND gate 116c are logical 1, a logical 0 is fed to it from NAND gate 116b, thereby causing NAND gate 116c to produce a logical 1 which prevents activation of switch 34c. Likewise, switches 34a–34p are not activated. That is, the switch coupled to the one of the filters 28a–28p which passes the signal having the lowest frequency is activated since the pass bands of filters 28a–28p are arranged in ascending order of frequency. In summary, then, NAND gate 116b prevents NAND gate 116c from producing a logical 0 signal even though NAND gate 114c produces a logical 1. Therefore, it follows in the general case where a plurality of comparators 86a–86p produce logical 1 indicating the presence of more than one CW signal that only one of the switches 34a–34p is activated, such activated switch being the one coupled to the one of the filters 28a–38p which passes the signal having the lowest frequency.

Before discussing the operation of the activity selector 36 in response to pulses, it is noted above that in response to CW signals the selected switch is activated for a predetermined time duration, here 200 ns., the duration of each pulse produced by the pulse generator 104. Further, each one of the NAND gates 112a–112p, 114a–114p and 118a–118p has about a 3 ns. delay inherent in it which prevents simultaneous switching as each one of the switches 34a–34p has about a 10 ns. inherent delay.

Considering now reception of a pulse as, for example, a pulse having a frequency which passes through filter 28a (FIG. 1). In response to such pulse, comparators 86a and 88a produce logical 1 signals while comparators 86b–86p and 88b–88p produce logical 0 signals. The logical 1 signal produced by comparator 88a is fed to NOR gate 100 which switches its output from a logical 1 to a logical 0 to thereby trigger one-shot multivibrator 110. When triggered, one-shot multivibrator 110 produces a pulse, here 250 microseconds long; in particular output Q goes to logical 1 for 250 microseconds while output $\overline{Q}$ goes to logical 0 for 250 microseconds. It is also noted that even during the time pulse generator 104 produces a pulse, i.e. during the period of time a test is being made for the presence of a received CW signal, a low signal at $\overline{Q}$ of multivibrator 110 causes the outputs of gated amplifiers 106, 107 to go low or logical 0. The logical 0 signals are fed to the P and C inputs of flip/flops 94a–94p, forcing the Q and $\overline{Q}$ outputs thereof to be both logical 1 signals. These logical 1 signals are fed to flip/flops 96a–96p, enabling them to operate in their "normal" mode, i.e., when the Q output of one-shot multivibrator 110 goes to logical 1, the flip/flops 96a–96p will store in them the logical signals fed to terminal D from comparators 88a–88p, respectively. Therefore, in this example, flip/flop 96a will store a logical 1 (produced by comparator 88a) while flip/flops 96b–96p will store logical 0 (produced by comparators 88b–88p). Consequently, the $\overline{Q}$ output of flip/flop 96a will be logical 0 while the $\overline{Q}$ outputs of flip/flops 96b–96p will be logical 1. Consequently, the output of NAND gate 114a will be logical 1 while the outputs of NAND gates 114b114p will be logical 0. Continuing, the output of NAND gate 116a will be logical 0 while the outputs of NAND gates 116b–116p will be logical 1. It follows, then, that switch 34a will be activated while switches 34b–34p will remain inactivated.

Considering the case where two pulses are received, one substantially stronger than the other, then, as in the case of CW signals described above, the weaker pulse will not exceed the threshold of the one of the comparators 86a–86p or 88a–88p coupled to the one of the filters 28a–28p which passes such weaker pulse, and only the stronger pulse will activate one of the switches 34a–34p in the manner described above. On the other hand, as in the case of a plurality of CW signals being received simultaneously, if a plurality of pulses is received and they have substantially equal strength, the one of the switches 34a–34p coupled to the one of the filters 28a–28p which passes the lowest frequency pulse will become activated, all other switches remaining inactivated.

Finally, consider the case where a CW signal is being received and a pulse is then received. If, for example, the CW signal causes comparator 86a to produce a logical 1 (comparators 86b-86p producing logical 0) to activate switch 34a and a pulse causes comparator 86b to produce a logical 1 signal, the Q output of one-shot multivibrator 110 goes high, and the output of gated amplifiers 106, 107 goes low, even if pulse generator 104 is producing a 200 ns. pulse. The Q and $\bar{Q}$ outputs of flip/flops 94a-94p are, therefore, logical 1, enabling flip/flops 96a-96p to operate in their normal mode. Also, in response to comparator 88a producing a logical 1 signal, the one-shot multivibrator 110 produces a 250 microseconds pulse so that, in response to such pulse, flip/flop 96b stores a logical 1 which causes output $\bar{Q}$ thereof to go to a logical 0 state, while flip/flops 96a and 96c-96p store logical 0 signals, causing their Q outputs to go to logical 1 states. It follows then, that the activity selector 36 now operates as described above in connection with the reception of a pulse and, in this example, switch 34b is activated while switch 34a is deactivated and while switches 34c-34p remain inactivated.

Figure 3:
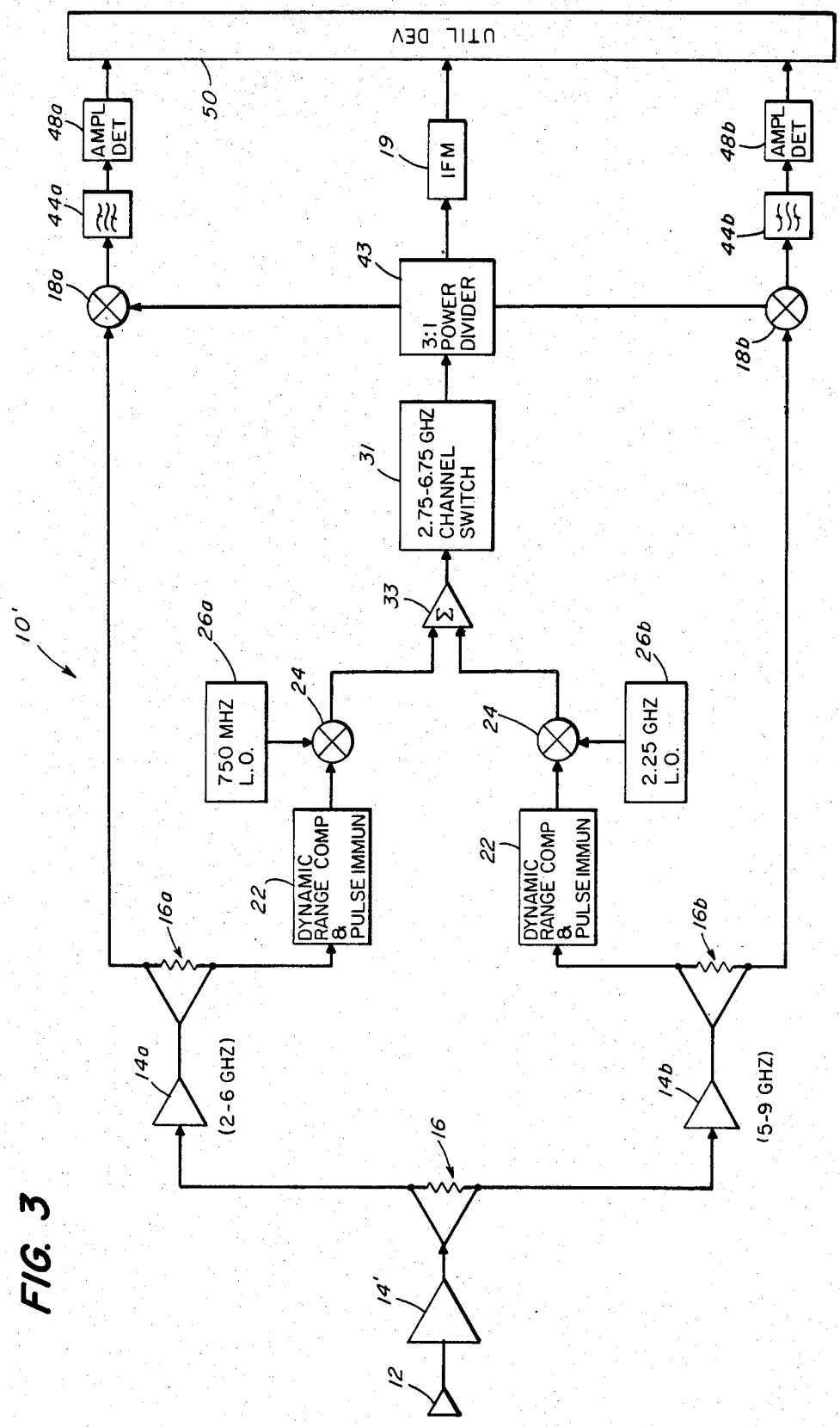
FIG. 3 is an alternative embodiment of a radio frequency receiver according to the invention.

Referring now to FIG. 3, a receiver 10' is shown, such receiver 10' here being adapted to operate over a band of frequencies from 2-9 GHz. Such receiver 10' includes a radio frequency amplifier 14' here having a bandwidth of 2-9 GHz. A 2:1 power divider 16 separates the received signals into a pair of channels, the upper channel being used to process signals within a 2-6 GHz band of frequencies, and the lower channel being used to process signals within a 5-9 GHz band of frequencies. Thus, the signals in the upper channel are passed to a radio frequency amplifier 14a, here having a bandwidth from 2-6 GHz while the signals in the lower channel are passed to a radio frequency amplifier, here having a bandwidth of 5-9 GHz. The signals produced at the output of amplifier 14a are fed to a 2:1 power divider 16a, such power divider 16a separating the signals fed thereto into two signal channels, the upper signal channel being coupled directly to a mixer 18a (similar to mixer 18 in FIG. 1), and the lower signal channel being fed indirectly to mixer 18a as such signals pass sequentially through: (1) a dynamic range compression and pulse immunity circuit 22 (equivalent to the circuit 22 shown in FIG. 1); (2) a mixer 24 (equivalent to mixer 24 in FIG. 1) where such signal is translated in frequency by here 750 MHz by a local oscillator 26a which produces a 750 MHz signal for mixer 24; (3) a summing amplifier 33; (4) a channel switch 31 (equivalent to the channel switch 31 shown in FIG. 1); and (5) a 3:1 power divider 43. The signals produced at the output of amplifier 14b are fed to a 2:1 power divider 16a, such power divider separating the signals fed thereto into a pair of signal channels, the lower signal channel being fed directly to a mixer 18b (similar to mixer 18a), and the upper signal channel being fed indirectly to mixer 18b as such signals pass sequentially through: (1) a dynamic range compression and pulse immunity circuit 22; (2) a mixer 24, here also fed by a local oscillator 26b which produces a signal here having a frequency of 2.25 GHz; (3) the summing amplifier 33; (4) the channel switch 31; and (5) the 3:1 power divider 43. It is first noted that the signals produced at the output of both mixers 24 will be within the same band of frequencies, here 2.75 GHz to 6.75 GHz, the same as those produced at the output of mixer 24 (FIG. 1). Consequently, a single channel switch 31 is used. The output of mixer 18a is fed to a narrow band filter 44a, here having a 50 MHz bandwidth and a center frequency of 750 MHz. The output of mixer 18b is fed to a bandpass filter 44b, here having a bandwidth of 50 MHz and a center frequency of 2.25 GHz. Signals received in the 2-5⁻ GHz portion of the 2-9 GHz receiver band (where 5⁻ is slightly less than 5) will appear at the output of the filter 44a as a 750 MHz IF signal, whereas signals received in the 5-9 GHz portion of the 2-9 GHz receiver band will appear at the output of filter 44b as a 2.25 GHz IF signal. In both cases, however, while a 4 GHz band of noise is fed directly to mixers 18a, 18b, only a 256 MHz band of noise is fed to such mixers 18a, 18b by channel switch 31, thereby improving the sensitivity of the receiver. The outputs of filters 44a, 44b are fed to amplitude detectors 48a, 48b, respectively, as shown.

The third output of the 3:1 power divider is fed to an IFM 19, as shown. The outputs of the amplitude detectors 48a, 48b and the IFM are fed to utilization device 50. It is noted that if the received signal has a frequency within the 2-5⁻ GHz band the output of amplitude detector will be significantly larger than that out of amplitude detector 48b. Conversely, if the received signal is within the 5-9 GHz band detector 48b will produce an output signal substantially greater than that produced by detector 48a. It is noted that there is an overlap in the bands 2-6 GHz and 5-9 GHz; however, the channel switch 31 resolves any ambiguity. For example, consider that the received signal has a frequency of 5.5 GHz. Such signal will be translated to a signal having a frequency of 4.750 GHz because of local oscillator 26a and will be translated to a signal having a frequency of 3.25 GHz because of local oscillator 26b. The channel switch 31 will couple the lowest frequency signal to its output, here the signal having the frequency of 3.25 GHz, to provide the local oscillator signal for mixers 18a, 18b. The portion of the received 5.5 GHz signal fed to mixer 18a will be translated to a frequency of 2.25 GHz and will be rejected by filter 44a. The portion of the received 5.5 GHz signal fed to mixer 18b will also be translated to a frequency of 2.25 GHz; however, such latter signal will pass through filter 44b. Hence the larger output of detector 48b, as compared with the output of detector 48a, will provide an indication that the signal is in the frequency range of 5-9 GHz.

Figure 4:
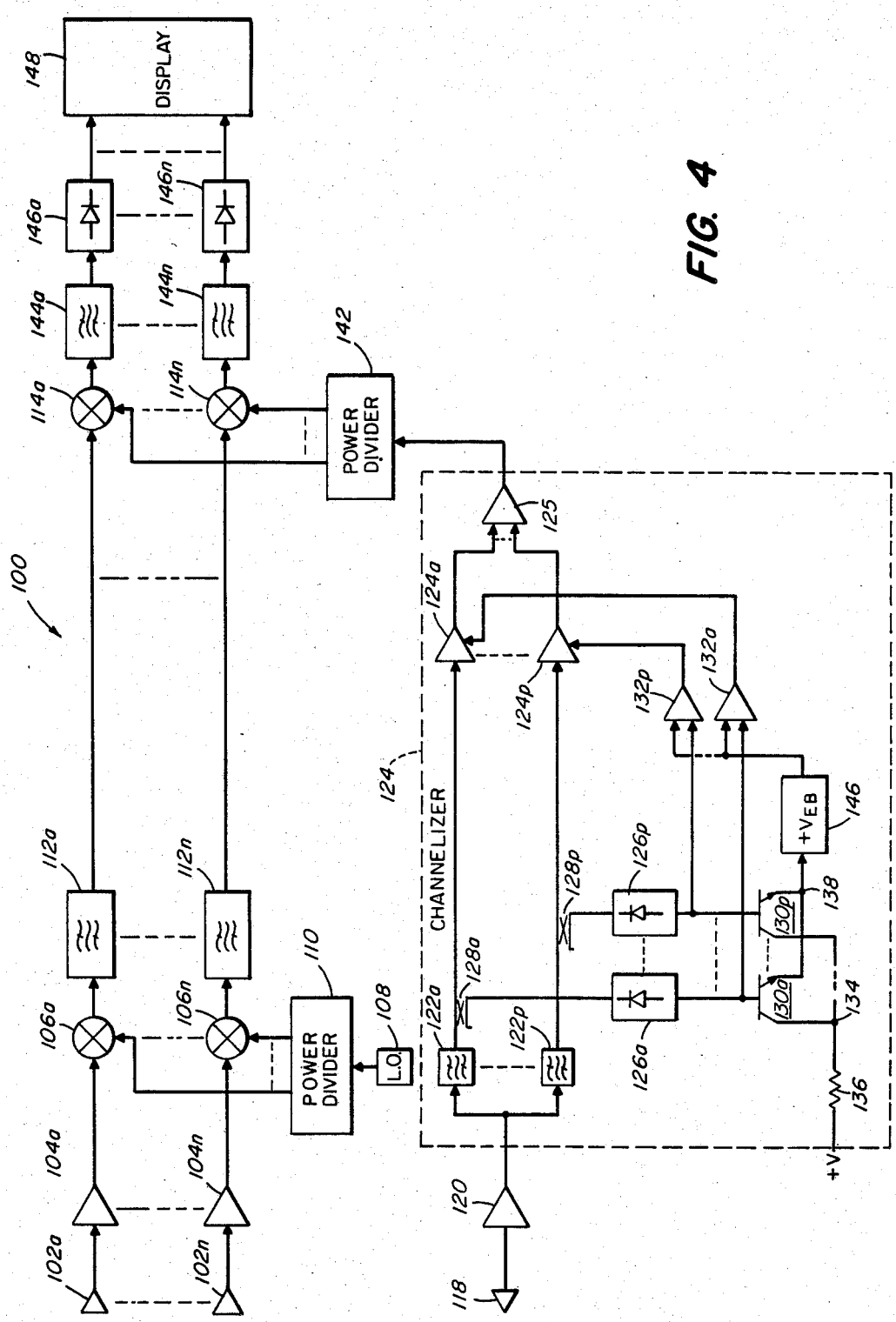
FIG. 4 is another alternative embodiment of a radio frequency receiver according to the invention.

Referring now to FIG. 4, a radio frequency signal direction finding apparatus 100 is shown. Here such apparatus is adapted for use in detecting the direction of a received signal. Apparatus 100 includes a plurality of directional antennas 102a-102n adapted to receive radio frequency signals from a corresponding plurality of, here n, directions. The antennas 102a-102n are coupled through a corresponding plurality of radio frequency amplifiers 104a-104n, respectively, to a corresponding plurality of single sideband mixers 106a-106n, respectively, as shown. Here the bandwidth of the amplifiers 104a-104n is 2 GHz to 6 GHz. A local oscillator 108, here adapted to produce an intermediate frequency (IF) signal having a frequency of 750 MHz, is coupled to each of the mixers 106a-106n through an n:1 power divider 110, as shown. The outputs of mixers 106a-106n are fed to a corresponding plurality of bandpass filters 112a-112n, respectively, as shown, each one of such filters 112a-112n having a bandpass of 2.750 GHz to 6.750 GHz. The outputs of filters 112a-112n are fed to a corresponding plurality of double balanced mixers 114a–114n, respectively, as shown. It follows, then, that a signal received by one of the antennas 102a–102n having a frequency $f_R$ is translated in frequency by the mixers 106a–106n (and filters 112a–112n) to a frequency, $f_R+(750$ MHz).

Receiver 100 also includes an omnidirectional antenna 118. The output of antenna 118 is fed to a conventional limiter 120. The bandwidth of the limiter 120 is here 2 GHz to 6 GHz. The limiter normalizes the received signals. The output of limiter 120 is fed to a channelizer 124 as shown. The channelizer 124 includes a plurality of bandpass filters, here sixteen bandpass filters 122a–122p which form a bank of sixteen contiguous narrow band filters, here each one having a bandwidth of 256 MHz. The complete bandwidth of the bank of filters is from 1.95 GHz to 6.048 GHz. The outputs of bandpass filters 122a–122p are coupled to both a corresponding plurality of gated amplifiers 124a–124p, respectively, as shown, and to a corresponding plurality of detectors 126a–126p, respectively, as indicated by means of a corresponding plurality of couplers 128a–128p, respectively as shown. The outputs of the gated amplifiers 124a–124p are coupled to a summing amplifier 125, as shown. The outputs of detectors 126a–126p are fed to the base electrodes of a corresponding plurality of transistors 130a–130p, respectively, as shown, and to a corresponding plurality of comparators 132a–132p, respectively, as shown. The collector electrodes of the plurality of transistors 130a–130p are connected together at terminal 134. A voltage source, +V, is coupled to terminal 134 through a resistor 136, as shown. The emitter electrodes of the plurality of transistors 130a–130n are connected together at a terminal 138 as shown. Terminal 138 is fed to the plurality of comparators 132a–132p through a $+V_{EB}$ voltage source 140, here providing a voltage of about +0.7 volts, i.e., the voltage drop across the base-emitter junction of a forward-biased one of the transistors 130a–130n. It follows, then, that when a signal within the 2 GHz to 6 GHz bandwidth is received, such signal passes through one of the bandpass filters 122a–122p, producing a substantially larger dc voltage at the output of the one of the detectors 126a–126p which is coupled to such one of the filters 122a–122p as compared with the dc voltage produced at the outputs of the other ones of the detectors 122a–122p. The significantly large dc voltage forward-biases the one of the transistors 130a–130p coupled to the one of the detectors 126a–126p, producing such significantly larger voltage. The voltage at the emitter electrode of such forward-biased one of the transistors 130a–130p is the same as the voltage at the base electrode thereof except for the 0.7 volt drop ($V_{EB}$) across the base-emitter junction. This drop is restored by the $+V_{EB}$ voltage source 146 so that the level of the signal produced at the output of such voltage source 146 is the same as the voltage at the base electrode of the forward biased one of the transistors 130a–130p. Comparators 132a–132p here produce a logical 1 signal when the pair of signals fed thereto is equal to each other or if the signal fed thereto from the base electrode of the transistor coupled thereto is greater than the voltage fed to such comparator from voltage source 146. Otherwise, comparators 132a–132p produce a logical 0. It follows, then, that in response to a received signal the one of the comparators 132a–132p coupled to the one of the filters 122a–122p which passes such signal will produce a logical 1 signal at its output while other ones of the comparators 132a–132p will produce logical 0 signals. The outputs of comparators 132a–132p are fed to gated amplifiers 124a–124p, respectively, to provide gating signals for such amplifiers. In operation, if a logical 1 signal is fed to the amplifier, the signals fed to such amplifier pass through it whereas, if a logical 0 is fed to such amplifier, the signals fed to such amplifier are inhibited from passing through it. It follows, then, that when a signal is received, such signal will pass through one of the filters 122a–122p and the output such one of such filters 122a–122p will be coupled to summing amplifier 125.

The output of summing amplifier 125 is fed through an n:1 power divider 142 to the plurality of mixers 114a–114n. It follows, then, that while a wide band of signals (2.750 GHz to 6.750 GHz) is fed to mixers 114a–114n through filters 112a–112n, only signals within a much narrower band (256 MHz) are passed to mixers 114a–114n via channelizer 124. The output of mixers 114a–114n is fed to narrow band filters 144a–144n, here each having a center frequency of 750 MHz and a bandwidth of 50 MHz. The outputs of filters 144a–144n are fed to a plurality of detectors 146a–146n, respectively, as shown. It follows, then, that, in operation, a signal is received by one of the antennas 102a–102n in accordance with the direction of the received signal. Such signal passes through the one of the mixers 106a–106n coupled to such one of the antennas 102a–102n where it is translated in frequency by here 750 MHz. The frequency translated signal passes through the one of the filters 112a–112n coupled to such one of the mixers 106a–106n and is homodyned with the signal received by the omni-directional antenna 118 (after such signal is passed through one of the bandpass filters 122a–122p) in the one of the mixers 114a–114n coupled to the one of the antennas 102a–102n, which receives such signal. An indication of the direction of the received signal is thereby provided by detecting the one of the detectors 146a–146n which produces a significant output voltage. Here the signals produced at the outputs of detectors 146a–146n are fed to a conventional display 148. It is also noted that, while noise having the entire 4 GHz bandwidth is passed to the mixers 114a–114n through filters 112a–112n noise received by the omnidirectional antenna 118 passing to mixers 114a–114n via channelizer 124 has a much narrower bandwidth, here a 256 MHz bandwidth, thereby improving the sensitivity of the receiver 100 as compared with a conventional homodyne receiver.

Having described preferred embodiments of the invention, it is now evident that other embodiments incorporating these concepts may be used. For example, other frequency bands than those described may be used. Further, more or fewer filters may be used in the channelizer. Still further, the bandwidth of the filters may be other than that described. Also, while the activity selector 36 selected the signal having the lowest frequency when a plurality of signals of equal strength was received, such selector 36 may have been modified to pass the signal having the highest frequency. It is felt, therefore, that this invention should not be restricted to the disclosed embodiment, but rather should be limited only by the spirit and scope of the appended claims.

What is claimed is:

1. In a radio frequency receiver for receiving radio frequency continuous wave and pulse signals, the receiver having an automatic gain control circuit for controlling the receiver gain, the automatic gain control circuit being adapted to change the receiver gain in response to the received continuous wave signals while not changing the receiver gain in response to the received pulse signals, the automatic gain control circuit comprising:

(a) variable attenuator means, fed by the received continuous wave and pulse signals, for attenuating such signals in accordance with a first control signal;

(b) limiting amplifier means fed by the variable attenuator means;

(c) detector means fed by the limiting amplifier means;

(d) integrator means for providing the first control signal;

(e) blocking means, fed by the detecting means, for passing rapidly varying detected signals and inhibiting slowly varying detected signals and direct current;

(f) comparator means, fed by the blocking means, for producing a second control signal when the amplitude of the signals from the blocking means exceeds a predetermined value; and (g) coupling means, responsive to the second control signal, for selectively coupling the detector means and the integrator means;

wherein the coupling means decouples the detector means from the integrator means when a pulse signal is received.

2. The radio frequency receiver as recited in claim 1 wherein the blocking means includes a high pass filter.

* * * * *